United States Patent [19]

Inagaki et al.

[11] Patent Number: 5,015,897
[45] Date of Patent: May 14, 1991

[54] GEARED ELECTRIC MOTOR

[75] Inventors: Atsushi Inagaki; Koh Hiratsuka; Hiroaki Miura; Yasujiro Saito, all of Yokohama, Japan

[73] Assignee: Jidosha Denki Kogyo K.K., Tokyo, Japan

[21] Appl. No.: 462,371

[22] Filed: Jan. 9, 1990

[30] Foreign Application Priority Data

Jan. 11, 1989 [JP] Japan ................... 1-2521[U]

[51] Int. Cl.⁵ .................. H02K 5/14; H01R 39/38
[52] U.S. Cl. ................................ 310/83; 310/80; 310/89; 310/239; 384/537; 384/903
[58] Field of Search ............. 310/83, 80, 89, 90, 310/239; 384/903, 537, 585

[56] References Cited

U.S. PATENT DOCUMENTS

| 2,619,391 | 11/1952 | Esarey | 384/537 |
| 3,463,951 | 8/1969 | Bauerle et al. | 310/83 |
| 4,132,109 | 1/1979 | Ladin | 384/903 |
| 4,364,615 | 12/1982 | Euler | 384/903 |
| 4,399,380 | 8/1983 | Hirano | 310/83 |
| 4,626,722 | 12/1986 | Fukui | 310/83 |
| 4,640,632 | 2/1987 | Brandenstein et al. | 384/537 |
| 4,710,037 | 12/1987 | Newberg | 384/537 |
| 4,713,568 | 12/1987 | Adam et al. | 310/83 |
| 4,885,948 | 12/1989 | Thrasher, Jr. et al. | 310/83 |

Primary Examiner—Steven L. Stephan
Assistant Examiner—Dennis R. Haszko
Attorney, Agent, or Firm—Sughrue, Mion, Zinn, Macpeak & Seas

[57] ABSTRACT

A geared electric motor is provided with an armature having an armature shaft supported within a motor yoke and a gear casing attached to said motor yoke by a radial ball bearing having an outer ring fixed to the gear casing and an inner ring fixed to the armature shaft of the armature using a stop ring and a push nut. A commutator is mounted on the armature shaft and a plurality of brushes carried by brush holders are in sliding engagement with the commutator. The brush holders are mounted on a brush holder base connected by elastic bushings to a brush holder base setting member which in turn is secured to the gear casing in engagement with the outer ring of the ball bearing to locate the outer ring in the gear casing.

2 Claims, 3 Drawing Sheets

GEARED ELECTRIC MOTOR

BACKGROUND OF THE INVENTION

1. Field of the Invention

This invention relates to a geared electric motor and, more particularly, to a small-sized electric motor provided with a reduction gear and used for driving electrical equipment of an automobile such as a wiper, a power window or the like.

2. Description of the Prior Art

Heretofore, there has been used a geared electric motor shown in FIG. 3 for example.

That is, a geared electric motor 100 shown in the figure is provided with a plain bearing 102 between the shaft and a motor yoke 101 at the position near to the right side end in the figure, with a journal bearing 104 made from oilless metal between the shaft and a gear casing 103 fitted to an open end of said motor yoke 101 in the center of FIG. 3 and furthermore is provided with a plain bearing 105 between the shaft and the gear casing 103 at the position near to the left side end in the figure.

The armature shaft 107 of an armature 106 housed in the motor yoke 101 is formed with square holes 107a and 107b in each end thereof along the longitudinal direction of the armature shaft 107, and said holes 107a and 107b house balls 108 and 109 rotatably in order to reduce frictional resistance. The motor yoke 101 is provided with a stopper plate 110 in the end portion on the right side in the figure, which is in contact with the ball 108 housed in the square hole 107a provided at one end of said armature shaft 107. The gear casing 103 is provided with a thrust screw 111 in the end portion on the left side in the figure, which is screwed or unscrewed in order to adjust the distance from the ball 109 housed in the square hole 107b provided to another end of said armature shaft 107.

Said armature shaft 107 is supported in a rotatable state by the plain bearing 102 attached to the motor yoke 101 on the right side thereof in the figure, and the ball 108 housed in the square hole 107a provided to the right side end of the armature shaft 107 in the figure is in contact with the stopper plate 110 attached to the motor yoke 101.

The journal bearing 104 installed to the gear casing 103 supports the near center portion of the armature shaft 107 in a rotatable state and the plain bearing 105 provided to the gear casing 103 also supports the armature shaft 107 in rotatable state on the left side in a the figure.

In this state, to supply a prescribed current to a commutator 113 installed on the armature shaft 107 through a brush 113 in the forward rotational direction or the reverse rotational direction, the armature 106 rotates in the forward or reverse direction according to an electromagnetic force produced between the armature 106 and a magnet 114 disposed on the inner periphery of the motor yoke 101. Thereby a worm wheel 115 rotates, which is engaged with a worm 107c provided on the left end of the armature shaft 107 of the armature 106 in the figure, and so an output shaft 116 fixed to said worm wheel 115 rotates in the forward or reverse direction.

The forward or reverse rotation of said output shaft 116 actuates a linkage of a wiper device or a regulator of a power window device (not shown), thereby a wiper blade of the wiper device or a window glass of the power window device is driven.

Hereupon, the thrust gap between the screw 111 and ball 109 is adjusted by screwing or unscrewing the thrust screw 111 against the ball 109 housed in the square hole 107b provided to the left end of the armature shaft 107 in the figure. The thrust load applied on the armature shaft 107 when the output shaft 116 rotates a wiper blade of the wiper device in the reverse direction is received by said thrust screw 111.

However, in the conventional geared electric motor 100, since the thrust screw 111 receives the thrust load applied on the armature shaft 107, it is necessary to adjust the thrust gap every time by screwing or unscrewing the thrust screw 111. Therefore, there is a problem in that it is difficult to keep the motor 100 in good rotational condition because the adjusting operation is complicated.

Additionally, said armature shaft 107 is provided with balls 108 and 109 in the square hole 107a and 107b made in both ends thereof, and housed in the motor yoke 101 and the gear casing 103 wherein said ball 108 is in contact with the stopper plate 110 disposed to the motor yoke 101 and the thrust screw 111 is screwed in the gear casing 103 against said ball 109 housed in the square hole 107b. Accordingly, the members for supporting the armature shaft 107 are large in number causing another problem since the motor 100 is expensive in its cost comparatively.

Concerning the thrust load, there has been a wiper motor in which thrust load is received by a radial ball bearing as disclosed in Japanese Utility Model Publication No. 61-3248/86. However, the outer ring of the radial ball bearing is fixed to the gear case of the wiper motor by caulking or deformation of the gear case, and it is necessary to apply a buffer in order to cope with measuring errors of the armature shaft of the motor in diameter, and the radial ball bearing in width or length. Consequently it is difficult to assemble the motor automatically.

Furthermore, in case of applying a specific flanged ball bearing having a diameter smaller than that of the commutator in order to facilitate automatic assembly of the motor, the assembly is easy but the cost of the motor increases on account of the specially-made bearing, and in the motor disclosed in Japanese Utility Model Publication No. 62-23244/87, it is difficult to assemble the motor automatically since it is necessary to fix the outer ring of said radial ball bearing to the frame by screws screwed from the outside of said frame of the motor.

SUMMARY OF THE INVENTION

This invention is made in view of the above mentioned problems of the prior art and it an object of the invention to provide a geared electric motor which is easy to assemble and is favorable in its cost while eliminating the need to adjust a thrust gap and making it easy to maintain in good condition.

The construction of the geared electric motor according to this invention for accomplishing the above mentioned object comprises an armature housed in a motor yoke and supported rotatably between said motor yoke and a gear casing attached to said motor yoke, a worm provided on an end of an armature shaft of said armature for transmitting the rotation of said armature to a worm wheel, a radial ball bearing provided with an outer ring and an inner ring for supporting said armature shaft rotatably, a brush housed in a brush holder for supplying an electric current to an armature coil of said armature through a commutator, and a holder base attached to said brush holder and fixed to said gear casing through a holder base setting member, and said outer ring of the radial ball bearing being fixed to the gear casing using said holder base setting member and said inner ring of the radial ball bearing being fixed to an armature shaft using a stop ring and a push nut.

The geared electric motor according to this invention has radial ball bearing with an outer ring fixed to the gear casing by the holder base setting member and an inner ring is fixed to the armature shaft by the stop ring and the push nut disposed on the armature shaft on each side of said inner ring. Therefore, it is unnecessary to adjust the thrust gap into a prescribed value and to provide balls on both ends of the armature shaft because the thrust load applied on the armature shaft is received by said radial ball bearing.

DESCRIPTION OF THE PREFERRED EMBODIMENT

Figure 1:
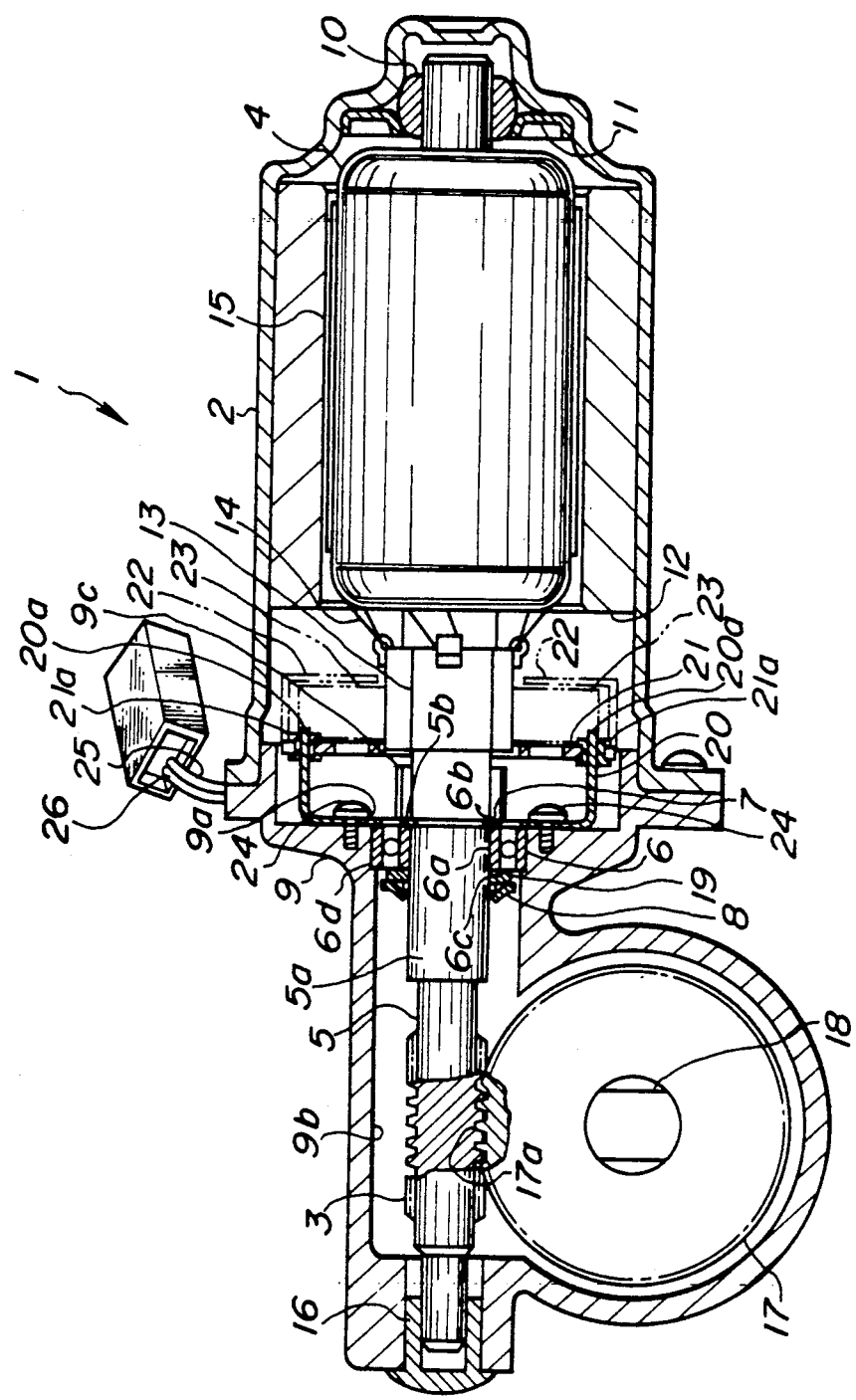
FIG. 1 is a longitudinal sectional view illustrating the geared electric motor according to an embodiment of this invention.

An embodiment of the geared electric motor according to this invention will be described below on basis of FIG. 1 and FIG. 2.

Namely, in the geared electric motor 1, as shown in the figures, a motor yoke 2 houses an armature 4 and an armature shaft 5 of said armature 4 is provided with a worm 3 on an end thereof. An inner ring 6a of a radial ball bearing 6 is fitted onto the armature shaft 5 in the middle part wherein the side walls 6b and 6c of said inner ring 6a are in contact with a stop ring 7 fitted in a groove 5b of the armature shaft 5 and a push nut 8 through a spacer 19 respectively. An outer ring 6d of said radial ball bearing 6 is fixed to a bearing setting part 9a secured to a gear casing 9 attached to said motor yoke.

The motor yoke 2 is installed with a plain bearing 10 for supporting the right end of the armature shaft 5 rotatably at the inner peripheral part near to the right side end by pressing with a bearing holder 11 in the rightward direction in FIG. 1, and has a cylindrical field magnet 12 secured on the inner periphery of the middle part thereof.

The armature shaft 5 of the armature 4 is formed with the worm 3 adjacent to the left side end in FIG. 1, and is provided with a large-sized shaft portion 5a having an outer diameter slightly larger than that of the worm 3 on the right side of said worm 3 in FIG. 1. The armature shaft 5 is installed with a commutator 13 coaxially thereon and with an armature core 15 provided with an armature coil 14 on the right side of the middle part of said large-sized shaft portion 5a.

Furthermore, said armature shaft 5 is so structured as to receive the thrust load in the leftward direction in FIG. 1 by fitting the stop ring 7 into the groove 5b provided in the armature shaft 5 on the left side of said commutator 13 and contacting it with the side wall 6b of the inner ring 6a of the radial ball bearing 6.

Additionally, the stop ring 7 is formed by bending a square wire into a ring having an inner diameter slightly smaller than an outer diameter of the large-sized shaft portion 5a, and is so designed as to fit into the groove 5b in said large-sized shaft portion 5a by putting it on the armature shaft 5 over the end part of the worm 3.

On the one hand, the gear casing 9 attached to the motor yoke 2 is provided with an armature shaft hole 9b for housing the armature shaft 5 which runs through the gear casing 9 in the horizontal direction in FIG. 1, and has an inner diameter larger than the outer diameter of the worm 3 formed on the armature shaft 5. Said armature shaft hole 9b is provided in the right side part with a bearing setting part 9a for attaching the radial ball bearing 6 to the gear casing 9 by fixing the outer ring 6d of the radial ball bearing 6.

The gear casing 9 is installed with a shaft supporting cap 16 for supporting the left side end of the armature shaft 5 rotatably adjacent the left side end of said armature shaft hole 9b in FIG. 1. In the lower side of said armature shaft hole 9b in FIG. 1, a worm wheel 17 having a toothed part 17a engaged with the worm 3 formed to said armature shaft 5 is fixed coaxially with an output shaft 18.

On the other hand, the radial ball bearing 6 of which inner ring 6a has an inner diameter the same as or slightly larger than the outer diameter of the large-sized shaft portion 5a of said armature shaft 5 is designed so that said inner ring 6a may fit onto said armature shaft 5 in the prescribed position.

The radial ball bearing 6 of which outer ring 6b has an outer diameter the same as or slightly smaller than an inner diameter of the bearing setting part 9a provided on said gear casing 9 is designed so that the radial ball bearing 6 may be fixed to the gear casing 9 by the holder base setting member 20 after inserting the outer ring 6d into said bearing setting part 9a.

The push nut 8 is attached to the large-sized shaft portion 5a of the armature shaft 5 together with the spacer 19 at the same time said large-sized shaft portion 5a is fitted into the inner ring 6a of the radial ball bearing 6 fixed to the gear casing 9.

Namely, the push nut 8 and the spacer 19 are supported so as to be in contact with the side wall 6c of the inner ring 6a of the radial ball bearing 6 of which outer ring 6b is fixed to the gear casing 9 by a suitable jig (not shown) arranged in the armature shaft hole 9b of the gear casing. In this state, the large-sized shaft portion 5a fitted with the stop ring 7 is inserted into the inner ring 6a of the radial ball bearing 6, the spacer 19 and the push nut 8. The push nut 8 is pressed with the jig in the rightward direction in FIG. 1 until said stop ring 7 fitted in the groove 5b provided in the large-sized shaft portion 5a is in contact with the side wall 6b of the inner ring 6a of the radial ball bearing 6.

Thereby, said inner ring 6a of the radial ball bearing 6 is fixed between the stop ring 7 and the spacer 19 fitting on the large-sized shaft portion 5a of the armature shaft 5, and the radial ball bearing 6 can receive the thrust load applied on the armature 4 in the rightward and the leftward direction in FIG. 1. Furthermore, even if measuring errors exist in width of the groove 5b, length of the radial ball bearing 6, thickness of the spacer 19 and so on, said errors can be compensated by the push nut 8, therefore the automatic assembly becomes possible.

Said push nut 8 is provided with inner pawls on the inner periphery thereof, and, as is generally known, is so designed as to move in the rightward direction but not to move in the leftward direction in FIG. 1 since said inner pawls bite into the large-sized shaft portion 5a so as to tolerate the thrust load in the leftward direction in this embodiment.

Numeral 21 in the figures is a holder base and, Numerals 22 and 23 are a brush holder and a carbon brush respectively.

Said holder base setting member 20 is fixed to the gear casing 9 by screws 24 in contact with the outer ring 6d of the radial ball bearing 6, and holder base 21 is fixed by inserting projections 20a provided on said holder base setting member 20 into rubber bushes 21a provided on the holder base 21 and engaging them in the rubber bushes 21a. Furthermore, said holder base 21 is provided with carbon brushes 23 and 23 connected with wires 25 and 26 respectively, said carbon brushes 23 and 23 are structured so as to be pressed on the commutator 13.

Additionally, numeral 21b in FIG. 2 is an elastic member, which is pressed into the holder base 21 and in contact with a contacting portion 9c of the gear casing 9, and serves to prevent vibration of the holder base 21 as well as the rubber bush 21a.

Figures 2A, 2B:
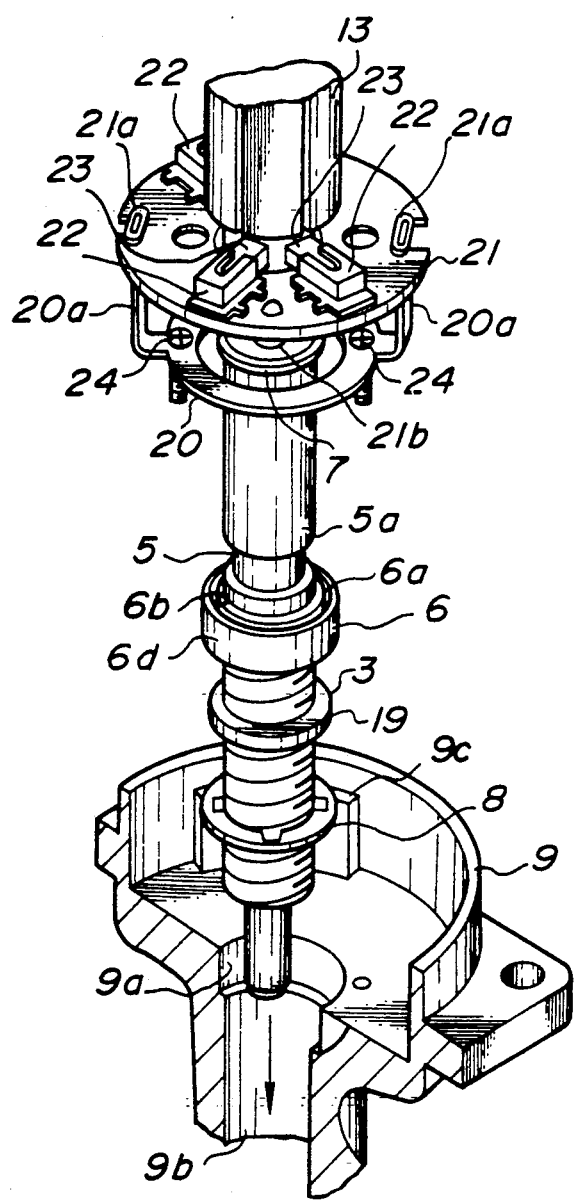
FIG. 2(a) is a perspective view illustrating the arrangement of the radial ball bearing in the geared electric motor shown in FIG. 1.
FIG. 2(b) is a perspective view illustrating the assembling relation of the holder base and the holder base setting member of the geared electric motor shown in FIG. 1.
Figure 3:
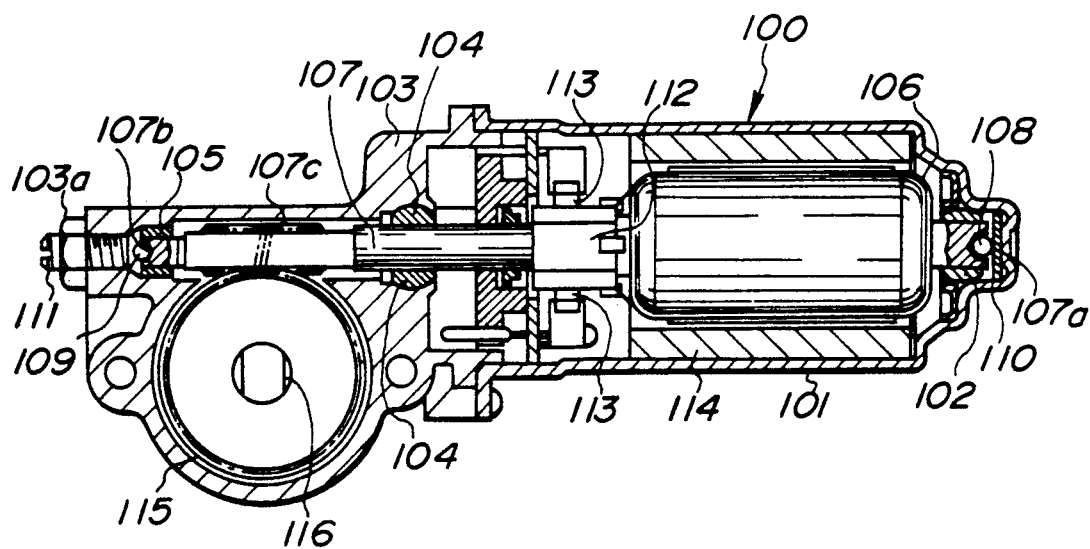
FIG. 3 is a longitudinal sectional view illustrating a conventional geared electric motor.

The numeral 20b in FIG. 2(b) designates a cutout for engaging said rubber bush 21a.

Namely, the push nut 8 can be fixed on the large-sized shaft portion 5a of the armature 5 at the same time the armature shaft 5 attached with the stop ring 7 is inserted into the inner ring 6a of the radial ball bearing 6 of which outer ring 6d is fixed to the gear casing 9 in the leftward direction from the right side in FIG. 1. Therefore, it is possible to fix the radial ball bearing 6 to the gear casing 9 in advance even if the diameter of the outer ring 6d is larger than that of the commutator 13, and it is possible to facilitate the automatic assembly.

Then, supplying a prescribed current to the commutator 13 through the carbon bushes 23 and 23 from the wires 25 and 26 in the forward rotational direction or the reverse rotational direction, an electro-magnetic force is produced between the armature 4 and the field magnet 12, thereby the armature 4 rotates in the forward or the reverse direction with the armature shaft 5 supported for rotation by the radial ball bearing 6.

By the rotation of the armature 4, the worm wheel 17 engaged with the worm 3 formed to the armature shaft 5 rotates and the output shaft 18 fixed to said worm wheel 17 rotates in the forward or the reverse direction.

Thereby, for example, a wiper device drives a wiper blade through a linkage (not shown) connected with said output shaft 18.

The thrust load, which is applied on the armature shaft more forcefully when said wiper blade turns in the reverse direction, is not received at both ends of the armature shaft 5, but is received by the radial ball bearing 6 supporting the armature shaft 5.

Furthermore, it need hardly be said that the geared electric motor according to this invention is also available for a power window system.

As mentioned above, the geared electric motor according to this invention comprises an armature housed in a motor yoke and supported rotatably between said motor yoke and a gear casing attached to said motor yoke, a worm provided on an end of an armature shaft of said armature for transmitting the rotation of said armature to a worm wheel, a radial ball bearing provided with an outer ring and an inner ring for supporting said armature shaft rotatably, a brush housed in a brush holder for supplying an electric current to an armature coil of said armature through a commutator, and a holder base attached to said brush holder and fixed to said gear casing through a holder base setting member with said outer ring of the radial ball bearing being fixed to the gear casing using said holder base setting member and said inner ring of the radial ball bearing being fixed to the armature shaft using a stop ring and a push nut. Therefore, it is unnecessary to adjust the thrust gap frequently and it is possible to assemble the motor merely from the same side and to reduce the number of the parts for supporting the armature shaft as compared with the conventional motor. Accordingly, excellent effects are obtained since it is easy to keep the motor in good condition and, it is possible to assemble the motor automatically and to reduce the cost considerably.

What is claimed is:

1. A geared electric motor comprising:
   a motor yoke and gear casing connected together;
   an armature having an armature shaft housed in said motor yoke and supported for rotation in said motor yoke and gear casing;
   a worm wheel rotatably mounted in said gear casing;
   a worm provided on an end of said armature shaft in meshing engagement with said worm wheel for transmitting rotation of said armature to said worm wheel;
   a radial ball bearing provided on said armature shaft and having an outer ring and an inner ring for rotatably supporting said armature shaft;
   a brush holder base setting member fixed to said gear casing;
   a brush holder base attached to the brush holder base setting member;
   a brush holder fixed on said brush holder base; and
   a brush housed in said brush holder for supplying an electric current to an armature coil on said armature through a commutator;
   wherein said outer ring of the radial ball bearing is secured to said gear casing by said brush holder base setting member and said inner ring of the radial ball bearing is secured on the armature shaft using a stop ring and a push nut.

2. A geared electric motor as set forth in claim 1, wherein said brush holder base is fixed to said base setting member by engaging a projection provided on said base setting member with an elastic bushing fitted on said brush holder base.

* * * * *